(12) United States Patent
Rastogi

(10) Patent No.: US 9,374,781 B2
(45) Date of Patent: Jun. 21, 2016

(54) METHOD FOR DISCONTINUOUS RECEPTION (DRX) IN DUAL CONNECTIVITY

(71) Applicant: AMAZON TECHNOLOGIES, INC., Reno, NV (US)

(72) Inventor: Nupur Rastogi, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/330,811

(22) Filed: Jul. 14, 2014

(65) Prior Publication Data

US 2016/0014691 A1 Jan. 14, 2016

(51) Int. Cl.
*H04W 52/02* (2009.01)
*H04W 76/04* (2009.01)

(52) U.S. Cl.
CPC ........ *H04W 52/0209* (2013.01); *H04W 76/046* (2013.01)

(58) Field of Classification Search
None
See application file for complete search history.

(56) References Cited

U.S. PATENT DOCUMENTS

| | | | | |
|---|---|---|---|---|
| 8,529,301 B2 * | 9/2013 | Al-Ali | ................ | H01R 13/6275 439/607.17 |
| 8,867,442 B2 * | 10/2014 | Pelletier | .............. | H04W 76/048 370/328 |
| 8,953,509 B2 * | 2/2015 | Lee | ................... | H04W 52/0251 370/311 |
| 2007/0183355 A1 | 8/2007 | Kuchibothla et al. | | |
| 2009/0232054 A1 | 9/2009 | Wang et al. | | |
| 2010/0165835 A1 * | 7/2010 | Hsu | ..................... | H04W 73/027 370/225 |
| 2011/0105069 A1 * | 5/2011 | Gaal | ................... | H04W 76/048 455/226.1 |
| 2012/0051226 A1 | 3/2012 | Cai | | |
| 2014/0029563 A1 | 1/2014 | Kim et al. | | |
| 2014/0161007 A1 | 6/2014 | Donthi et al. | | |
| 2014/0185467 A1 | 7/2014 | Heo et al. | | |
| 2015/0055532 A1 * | 2/2015 | Lu | ..................... | H04W 52/0225 370/311 |
| 2015/0098379 A1 * | 4/2015 | Lunden | ............... | H04W 76/048 370/311 |
| 2015/0195867 A1 * | 7/2015 | Koc | ...................... | H04W 88/06 370/311 |
| 2015/0215965 A1 * | 7/2015 | Yamada | .............. | H04W 76/046 370/329 |

OTHER PUBLICATIONS

Ghadialy, Zahid, "3G4G Small Cells Blog: Dual-connectivity, Bearer split and other Release-12 small cell enhancements," available at http://smallcells.3g4g.co.uk/2014/01/dual-connectivity-bearer-split-and.html, Jan. 19, 2014, 1 page.
International Search Report & Written Opinion on application No. PCT/2015/040164 mailed on Oct. 6, 2015.

\* cited by examiner

*Primary Examiner* — Brian Roberts
(74) *Attorney, Agent, or Firm* — Lowenstein Sandler LLP

(57) ABSTRACT

Systems and methods for a multi-connectivity DRX mode are described. When a device is concurrently connected to more than one node of a wireless network, a first node may determine a DRX configuration for both a first communication channel between the device and the first node and a second communication channel between the device and the second node based on an existing DRX cycle of the second communication channel. The DRX configuration may be sent to the device, so that the device may use the DRX configuration when concurrently connected to the first node and the second node of the wireless communication network.

18 Claims, 11 Drawing Sheets

US 9,374,781 B2

METHOD FOR DISCONTINUOUS RECEPTION (DRX) IN DUAL CONNECTIVITY

BACKGROUND

A large and growing population of users is enjoying entertainment through the consumption of digital media items, such as music, movies, images, electronic books, and so on. The users employ various electronic devices to consume such media items. Among these electronic devices (referred to herein as user device and user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

Figure 1:
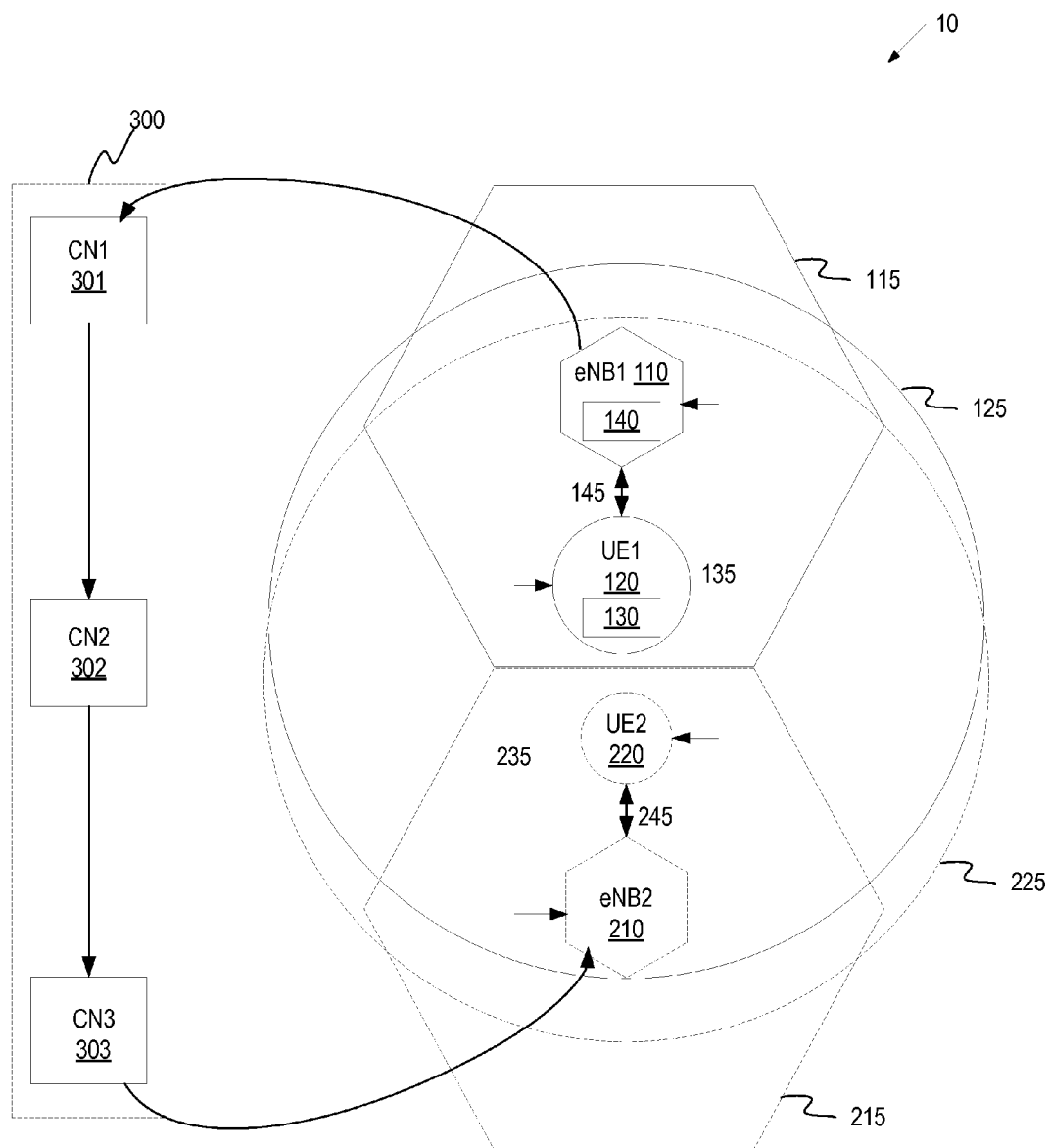
FIG. 1 illustrates an exemplary embodiment of a cellular network.

A cellular network includes a number of nodes interconnected by a core network. The core network is the central part of a telecommunication network that provides various services to users who are connected via the nodes. Typically, the communications infrastructure requires that when a user equipment (UE) uses a Discontinuous Reception (DRX) technique (e.g., in idle mode and connected mode in Long Term Evolution (LTE)), the UE wakes up from a sleep mode periodically to decode any control channel information (e.g., physical downlink control channel (PDCCH)) sent to the UE and performs various measurements, as defined in a standard specification, such as, for example, the $3^{rd}$ Generation Partnership Project (3GPP) specification. The 2G and 3G terminals use discontinuous reception in idle mode, whereas in LTE uses DRX both in idle and connected mode. By idle mode, the UE is not utilizing radio resources. Whereas in connected mode, the UE utilizes radio resources and battery consumption is very high due to 'over the air' communication between mobile terminal and a base station of the network. In LTE when there is no data to receive or transmit, the UE can switch off its transceiver for a very short interval per the UE's DRX configuration. The DRX feature in connected mode is likely to conserve battery usage by the UE (e.g., mobile device). The mobile device and the network negotiate the DRX configuration to indicate the time slots in which data transfer occurs and when the UE can switch off its transceiver(s). For example, the 3GPP specification indicates when connected to a Long Term Evolution (LTE) cell, the UE follows a connected mode DRX in which it sleeps periodically as per the connected mode DRX configuration from an element of a core network, the element being called a Evolved Node B (abbreviated as eNodeB or eNB). The eNodeB, also known as an E-UTRAN Node B is the element in E-UTRA of LTE that is the evolution of the element Node B in UTRA of UMTS. The eNodeB is hardware that is connected between other devices in the core network and the UEs, like a base transceiver station (BTS) in GSM networks. In addition to using DRX in connected mode, the UE can follow an idle mode DRX in which it sleeps as per the idle mode DRX configuration from the eNB. When the DRX technique is on while in connected mode, the UE does not decode the PDCCH and consequently does not perform any other transmission or reception. When the UE is decoding the PDCCH and performing transmission or reception, the current drain on the UE's battery is higher than when not decoding the PDCCH and performing transmission or reception. The longer the UE is active to perform these activities in the connected mode, the greater the current drain is on the UE. The DRX feature in the connected mode allows the UE to reduce the current drain on the UE's battery by identifying when the UE can power down the radio resources because it does not need to decode the PDCCH or perform any other transmission or reception. Recent developments in dual connectivity technology, where a UE is concurrently connected to two or more nodes of a wireless communication network, created complications in determining and utilizing DRX techniques. Dual connectivity refers to the UE's ability to wirelessly communicate with two separate devices over two separate communication channels.

Methods and systems for determining and implementing a DRX technique for a user equipment (UE) when the UE is connected to multiple nodes concurrently are described herein. The DRX technique may be used in an idle mode or connected mode in LTE, URA_PCH mode, CELL_PCH mode, or any other mode in which the user device wakes up periodically from being asleep, and periodically decodes any data, and performs serving cell and neighboring cell measurements. URA or UTRAN Registration Area is a collection of cells that are used for fast moving UE's in Connected mode when they are not transferring any data. In this case the UE is in CELL_PCH mode. Each time a fast moving UE in CELL_PCH state changes the cell, a CELL UPDATE needs to be performed to let the UTRAN know of the new position of the UE. This is done because in the connected mode (CELL_PCH), UE is known at cell level rather than UTRAN level as in IDLE state. If too many CELL UPDATES are performed, it defeats the purpose of UE being in CELL_PCH. Hence in this case the UE is put in URA_PCH state. Now the UE will perform CELL UPDATE only when the URA is changed for a UE. A user device, also referred to herein as a user equipment or UE, may be any device such as portable or mobile devices, most of which can connect to a network. Examples of user devices include electronic book readers, cellular telephones, personal digital assistants (PDAs), portable media players, tablet computers, netbooks, and the like. A user device may connect to a network to obtain content from a server (e.g., an item providing system) or to perform other activities. The user device may connect to one or more different types of cellular networks. A cellular network is a radio network distributed over land areas called cells, each served by at least one fixed-location transceiver typically known as a base station. When joined together, these cells provide radio coverage over a wide geographic area. This enables a large number of portable transceivers of user devices to communicate with each other and with fixed transceivers and telephones anywhere in the network, via base stations, even if some of the transceivers are moving through more than one cell during transmission.

In one embodiment, a UE is connected to an eNodeB. An existing DRX cycle configuration may be in place for a first communication channel with the eNodeB. The DRX cycle identifies when to power off and power on radio resources of the UE to communicate with the eNodeB. The UE may then establish a second communication channel with a second eNodeB while maintaining connectivity with the first eNodeB. Different concurrent connections may be handled by the same transceiver (TRX) on a UE or by different TRXs. In one embodiment, the first eNodeB may receive DRX cycle configuration information from the second eNodeB. DRX configuration may include various parameters, including information that defines a DRX cycle that includes the "On Duration" during which the UE should monitor the PDCCH and a "DRX period" during which a UE can power off the radio resources and skip receipt of downlink channels for battery saving purposes. The DRX configuration may also include information regarding transitions between short DRX cycles, the long DRX cycles and continuous reception. The transmissions may be controlled either by a timer or by explicit commands from the eNBs. For example, the UE may check for scheduling messages (by its C-RNTI on the PDCCH) during the 'On Duration' period of either the long DRX cycle or the short DRX cycle depending on the currently active cycle. When a scheduling message is received during an 'On Duration', the UE may start a 'DRX Inactivity Timer' and monitors the PDCCH in every subframe while the DRX Inactivity Timer is running. During this period, the UE can be regarded as being in a continuous reception mode. Whenever a scheduling message is received while the DRX Inactivity Timer is running, the UE restarts the DRX Inactivity Timer, and when it expires the UE moves into a short DRX cycle and starts a 'DRX Short Cycle Timer'. The short DRX cycle may also be initiated by means of a Medium Access Control (MAC) Control Element (MAC CE).

Based on the DRX configuration information received by the first eNodeB, a new DRX cycle may be determined. The new DRX cycle can include the "On Duration" and the DRX period as described above. The first eNodeB can determine the new DRX cycle by calculating a new "On duration" and DRX period that works for both communication channels, or may utilize the existing DRX configuration for the new DRX cycle when certain conditions applies, as described herein. This new DRX cycle may be a subset of the first and second DRX cycles originally implemented by the first and second eNodeB, respectively. The new DRX configuration information may then be sent to the UE so that a single DRX cycle may be implemented by the UE despite the UE being in a multi-connectivity state. The new DRX configuration may include a duration during which the UE monitors a physical downlink control channel and a DRX period during which a UE can power off the radio resources. The new DRX configuration may define a third DRX cycle that identifies when the UE can power off and power on the radio resources while the UE is concurrently connected to the first eNodeB on the first communication channel and the second eNodeB on the second communication channel. As described herein, a dual-connectivity state is when the UE is connected to both a first node on a first communication channel between the UE and the first node and a second node on a second communication channel between the UE and the second node. A multi-connectivity state is when the UE is connected to multiple nodes on multiple communication channels between the UE and respective ones of the multiple nodes.

FIG. 1 illustrates an exemplary embodiment of a cellular network. The cellular network 10 includes a first eNodeB (eNB1) 110 and a second eNodeB (eNB2) 210 coupled to a core network 300. Although some embodiments described herein refer generally to an LTE (Long Term Evolution) cellular network, it is to be appreciated that other aspects described herein may be used in other networks. For example, aspects described herein may be used in a LAN (local area network) or a PAN (personal area network). Similarly, although terminology specific to LTE or other network standards may be used, it is to be appreciated that aspects may be applicable to other types of networks. For example, aspects described with respect to an eNodeB may be used with respect to a Node B, a base transceiver station (BTS), a base station, a server, a node or other wireless communication hardware with which to communicate with user equipment (UEs) or mobile stations (MSs). The base station may include (1) a transceiver with which to receive wireless signals from user equipment and transmit wireless signals to user equipment and (2) a network interface to communicate with the core network. Thus, the base station couples the user equipment to the cellular network 10.

The eNB1 110 has a communication range defining a first cell 115 and the eNB2 210 has a communication range defining a second cell 215. A first user equipment (UE1) 120 is located within the first cell 115 and able to receive transmissions from the eNB1 110 and eNB2 210. The UE1 120 has a communication range 125 encompassing the eNB1 110 and the eNB2 210 and thus, both the eNB1 110 and eNB2 are able to receive transmissions from the UE1 120. Similarly, a second user equipment (UE2) 220 is located within the second cell 215 and able to receive transmissions from the eNB1 110 and eNB2 210. The UE2 220 has a communication range 225 encompassing the eNB1 110 and eNB2 210 and thus, both the eNB1 110 and eNB2 210 are able to receive transmissions from the UE2 220. The UE1 120 and UE2 220 may include any device used directly by an end-user to communicate. For example, the UE1 120 and UE2 220 may be a hand-held telephone, a tablet computer, a laptop computer equipped with a mobile broadband adapter or any other device.

In a normal mode, for the UE1 120 to communicate a message to another device in the core network 300 or to another device outside the core network 300, the UE1 120 transmits data to the eNB1 110, the eNB1 110 transmits the message through the core network 300 to its destination, such as to the UE2 220 via the eNB2 210. The core network 300 may include a number of core network components 301-303 including a Mobility Management Entity (MME), a Serving Gateway (SGW), a PDN [Packet Data Network] Gateway (PGW), a Home Subscriber Server (HSS), an IP Multimedia System (IMS), and other network elements. Thus, a message transmitted by the UE1 120 may traverse the eNB1 110, the eNB2 210, and a number of core network components 301-303 before being received by the UE2 220. Additional details regarding the normal mode of communication are described below with respect to FIG. 3.

In the exemplary embodiment of FIG. 1, UE1 120 may maintain concurrent connectivity with eNB1 110 through communication channel 145 and also with eNB2 210 though communication channel 235. Likewise, UE2 220 may maintain concurrent connectivity with eNB1 110 through communication channel 135 and also with eNB2 210 though communication channel 245. In one embodiment, one TRX in UE2 220 may handle both communication channel 135 and communication channel 245. Similarly, one TRX in UE1 210 may handle both communication channel 145 and communication channel 235. In another embodiment, multiple TRXs in UE2 220 may handle both communication channels 135 and 245, as well as any number of additional connections.

In one embodiment, eNB1 110 may include multi-connectivity DRX calculator 140. In one embodiment, multi-connectivity DRX calculator 140 manages DRX cycle configuration for eNB1 110, with respect to UE1 120 and UE2 220. Additional details of multi-connectivity DRX calculator 140 are described below with respect to FIGS. 4-11. UE1 120 may include DRX engine 130 which may receive DRX configuration information from multi-connectivity DRX calculator 140.

It is to be appreciated that FIG. 1 illustrates a particular orientation of the UEs at a particular point in time and that the UEs may be mobile devices that, at other times, may be associated with different eNodeBs, out of communication range of each other, out of communication range of the network, turned off, or otherwise at different locations. In particular, whereas FIG. 1 illustrates the first UE1 120 and the second UE2 220 in proximity of each other, this is not necessarily always the case.

Figure 2:
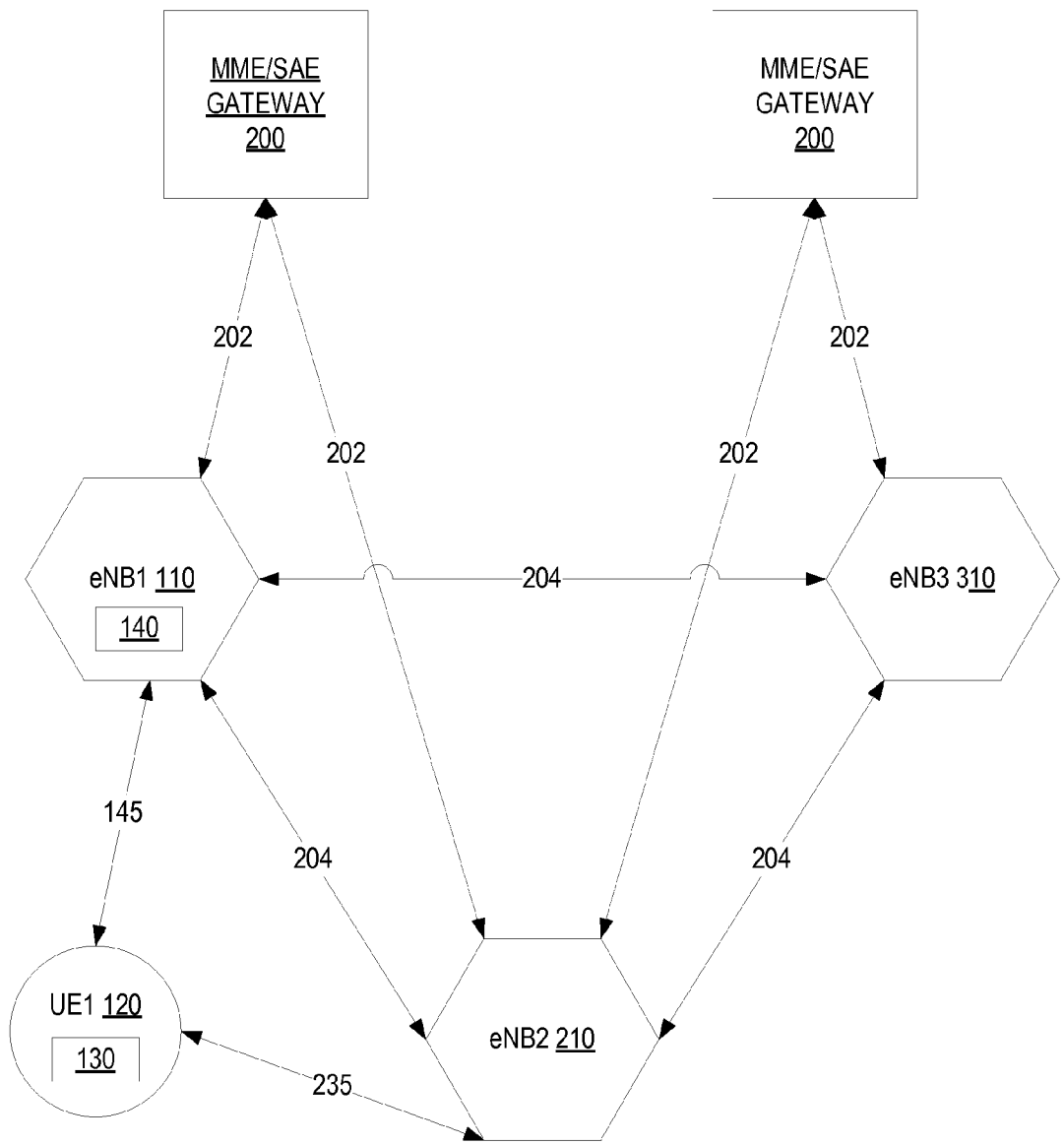
FIG. 2 is a block diagram of a communication network between a first, second, and third node (eNB), and a device.

FIG. 2 is a block diagram of a communication network between a first, second, and third node (eNB), and a device (UE1 120). The eNBs may communicate with core network components 200 by communication channel 202. In one embodiment, core network components 200 may include Mobility Management Entities (MME's) as part of a System Architecture Evolution (SAE) gateway. MME's are responsible for initiating paging and authentication of a UE among other responsibilities. In one embodiment, MME's connect to UE's through communication channel 202. In such an arrangement, communication channel 202 may be a S1-MME interface. In another embodiment, a Serving Gateway (S-GW) may use a different interface such as the S1-U for user plane traffic.

In one embodiment, UE1 120 is concurrently connected to eNB1 110 and eNB2 210 over communication channel 145 and 235 respectively, and eNB1 110, eNB2 210, and eNB3 310 are connected to each other by communication channel 204. In one embodiment, communication channel 204 may be over an X2 interface using the X2-AP protocol. In other embodiments a different protocol or interface may be used. In one embodiment, eNBs may use communication channel 204 to send timing information from one eNB to another. Timing information may include DRX cycle information as described herein. A current eNodeB may use such timing information (e.g., multi-connectivity DRX calculator 140 described herein) to determine a new DRX cycle configuration for a UE1 120 that is concurrently connected to multiple eNBs (e.g., the current eNodeB and an existing eNodeB). In another embodiment, various other types of information may be transmitted from one eNB to one or more eNBs. Multi-connectivity DRX calculator 140 may use the transmitted information to determine a new DRX cycle for a UE, or modify an existing DRX cycle for the device.

Figure 3:
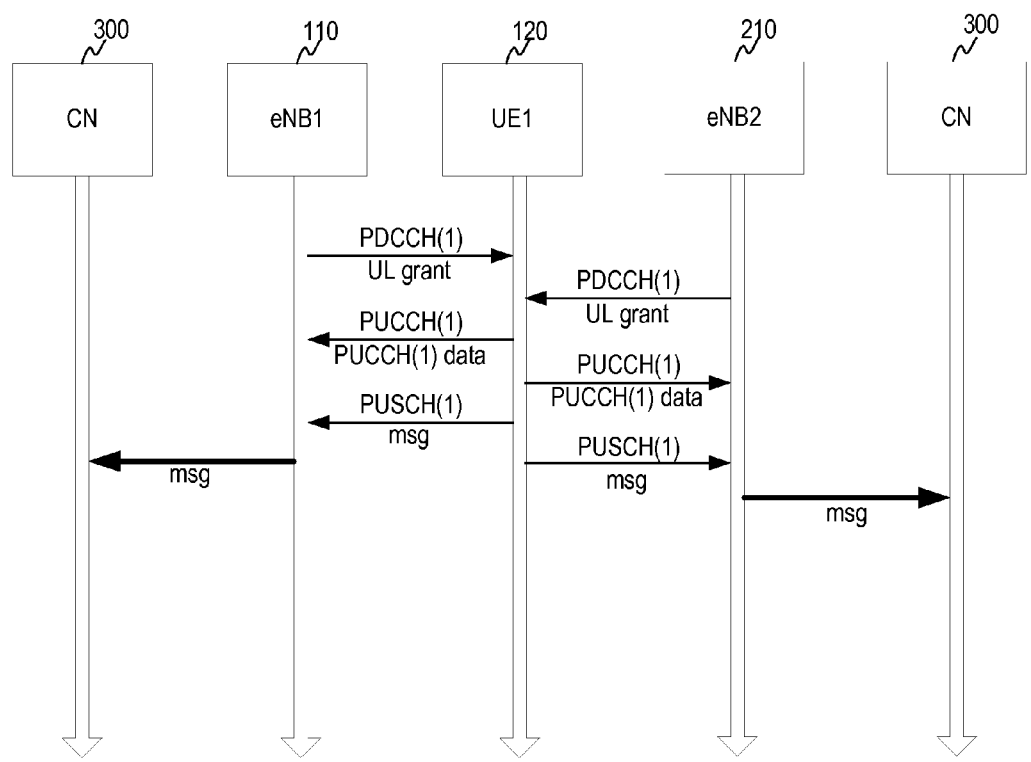
FIG. 3 is a communications timing diagram of a first user equipment (UE1) sending messages while concurrently connected to two nodes (eNB).

FIG. 3 is a communications timing diagram of a first user equipment (UE1) sending messages while concurrently connected to two nodes (eNB). For the UE1 120 to send a message (or other data), the UE1 120 receives an uplink (UL) grant from the eNB1 110 on a downlink control channel. The downlink control channel (along with other channels) may be established during an association procedure between the user equipment and the eNodeB. The downlink control channel may encode control data from the eNodeB to the user equipment. It is to be appreciated that the terms "encode" and "decode" as used herein may include or exclude encryption and decryption, compression and decompression, modulation and demodulation, or other processing.

In one embodiment, the downlink control channel may be a Physical Downlink Control Channel (PDCCH). Thus, the grant may be received on the PDCCH of the eNB1 110 [PDCCH(1)]. The PDCCH may utilize Orthogonal Frequency Division Multiplexing (OFDM). OFDM uses a large number of narrow sub-carriers for multi-carrier transmission to carry data instead of using one signal over a complete 5 MHz bandwidth. OFDM signals may be grouped in resource blocks, where each user is allocated a number of resource blocks in the time/frequency grid. The more resource blocks a user gets, and the higher the modulation used in the resource elements, the higher the bit-rate.

The UL grant provides the UE1 120 with an indication of channel resources to be used by the UE1 120 to transmit the message (and possibly additional messages) to the eNB1 110 on an uplink data channel. Likewise, the DL grant provides the UE1 120 with an indication of channel resources to be used by the UE1 120 to receive the message (and possibly additional messages) from the eNB1 110 on a downlink data channel. The channel resources may be one or more of a time period, a frequency band, a spreading code, a frequency hop pattern, an electromagnetic (EM) polarity, or any other channel resource. A spreading code or a frequency hop pattern may be one of a set of orthogonal waveforms used in spread-spectrum communication systems. Spread-spectrum communication systems allow transmission of different data at the same time and at the same frequency using different spreading codes (or frequency hops patterns) and which can still be separated at the receiver. Electromagnetic polarity may be an orientation of the electromagnetic wave. An electromagnetic wave with a single polarity may be referred to as "polarized light." Two electromagnetic waves transmitted at the same time and at the same frequency, but with different, perpendicular polarities, may be separated at the receiver.

The uplink data channel may encode message data from the user equipment to the eNodeB. In one embodiment, the uplink data channel may be a Physical Uplink Shared Channel (PUSCH). Thus, the message may be transmitted on the PUSCH of the UE1 120 [PUSCH(1)] using the resources indicated by the UL grant. The downlink data channel may encode message data from the eNodeB to the user equipment. In one embodiment, the downlink data channel may be a Physical Downlink Shared Channel (PDSCH). Thus, the message may be transmitted on the PDSCH of the UE1 120 [PDSCH(1)] using the resources indicated by the DL grant.

Along with transmitting the message on the PUSCH(1), the UE1 120 transmits control data to the eNB1 110 on an uplink control channel. The uplink control channel may encode control data from the user equipment to the eNodeB. In one embodiment, the uplink control channel may be a Physical Uplink Control Channel (PUCCH). Thus, the control data may be transmitted on a PUCCH of the UE1 120 [PUCCH (1)]. The control data may include, among other things, acknowledgement data such as ACK/NACK of prior received signals and the eNB1 110 may use control data to make future decisions on (re)transmission, channel allocation, etc.

Once the eNB1 110 decodes the message on the PUSCH (1), the eNB1 110 transmits the message over the core network 300. On receiving a message from the core network 300 eNB1 110 encodes the PDSCH and sends it to the UE1 120. Since UE1 120 is also in range of eNB2 210, the above procedure may be followed to send and receive a message or other data through eNB2 210 while concurrently connected to eNB1 110.

A UE may be concurrently connected to multiple eNBs (in a multi-connectivity state) in several variations and for different reasons. In one example, a single bearer may be split across multiple eNBs. In this situation, the DRX configuration for both eNBs can have the same DRX parameters, such as the "On Duration," "the DRX period," or the like. In another example, two eNBs can support two different services independently requiring DRX parameters to be the same or different for the different connections depending on the Quality of Service (QoS) requirements of each service. Two eNBs may be time-aligned if their respective DRX cycles are time aligned. The eNBs may also operate on the same or consecutive frequency bands so that a single transceiver (TRX) can be used for multiple eNBs. Alternatively, multiple TRXs may be necessary if the eNBs operate on different frequencies. The methods presented below describe embodiments of implementing DRX in these multi-connectivity scenarios.

Figure 4:
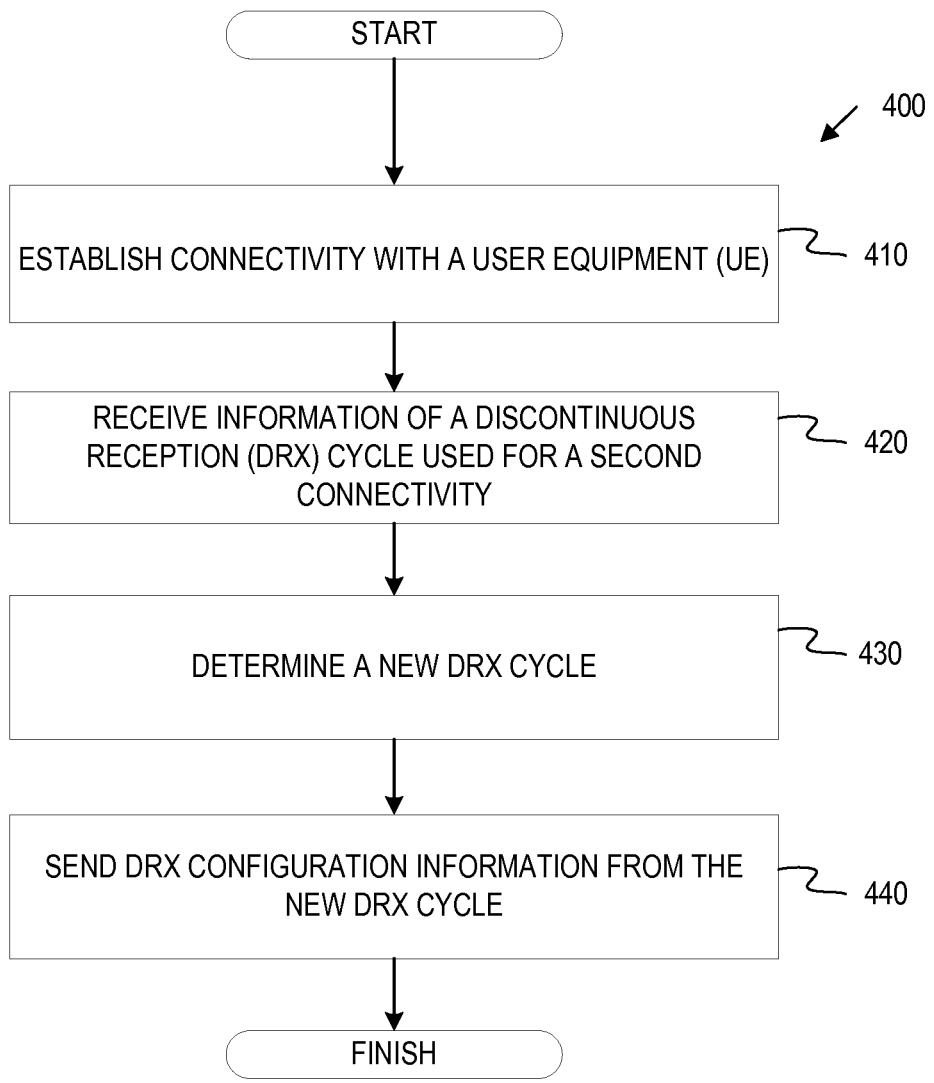
FIG. 4 is a flowchart illustrating an embodiment of a method of determining a new DRX cycle for a user equipment in dual connectivity.

FIG. 4 is a flowchart illustrating an embodiment of a method 400 of determining a new DRX cycle for a user equipment in a multi-connectivity state. The method 400 is performed by processing logic that comprises hardware (e.g., circuitry, dedicated logic, programmable logic, microcode, etc.), software (e.g., instructions run on a processing device to perform hardware simulation), or a combination thereof. In one embodiment, multi-connectivity DRX calculator 140 may perform method 400. In another embodiment, other components of the devices illustrated in FIGS. 1 and 2 perform some or all of the operations. Method 400 may be performed in any order so as to fit the needs of the DRX configuration to be accomplished.

At block 410, connectivity is established between a UE 120 and an eNB1 110 on a first communication channel. In one embodiment, the connectivity utilizes an existing DRX cycle configuration on UE 120. In another embodiment, the first communication channel does not currently utilize a DRX cycle.

At block 420, eNB1 110 receives information of a second DRX cycle that is currently being utilized by a second communication channel between a second eNB2 210 and UE 120. In one embodiment, the information may be received through communication channel 204 directly from eNB2 210 to eNB1 110. In another embodiment, the information of the second DRX cycle may be received from UE 120. The order in which connections are established and corresponding DRX cycle information is sent and received can vary. In one embodiment, it may be the second eNB2 210 that receives information about the first eNB1 110's DRX cycle information. In other embodiments, other devices in the core network can maintain a timing table that has timing differences (e.g., timing difference between system frame numbers (SFNs)) between the eNBs in the network.

At block 430, a new DRX cycle is determined based on the DRX cycle configuration information received at block 420. In one embodiment, the new DRX cycle is determined using only information about the DRX cycle configuration received at block 420. In other embodiments, other configuration information besides timing information may be used to make the determination. In one embodiment, the receiving eNodeB (eNB1 110) determines the new DRX cycle. In another embodiment, the sending eNodeB (eNB2 210) determines the new DRX cycle. In other embodiments other eNodeBs besides eNB1 110 and eNB2 210 determine the new DRX cycle.

At block 440, the new DRX cycle information determined at block 430 is sent to UE 120. In one embodiment, the new DRX cycle is used by the UE for the first communication channel to eNB1 110 and the second communication channel to eNB2 210. In another embodiment, the new DRX cycle may be used by either eNB1 110 or eNB2 210. In one embodiment, the receiving eNodeB (eNB1 110) sends the new DRX cycle. In another embodiment, the sending eNodeB (eNB2 210) sends the new DRX cycle.

Figure 5:
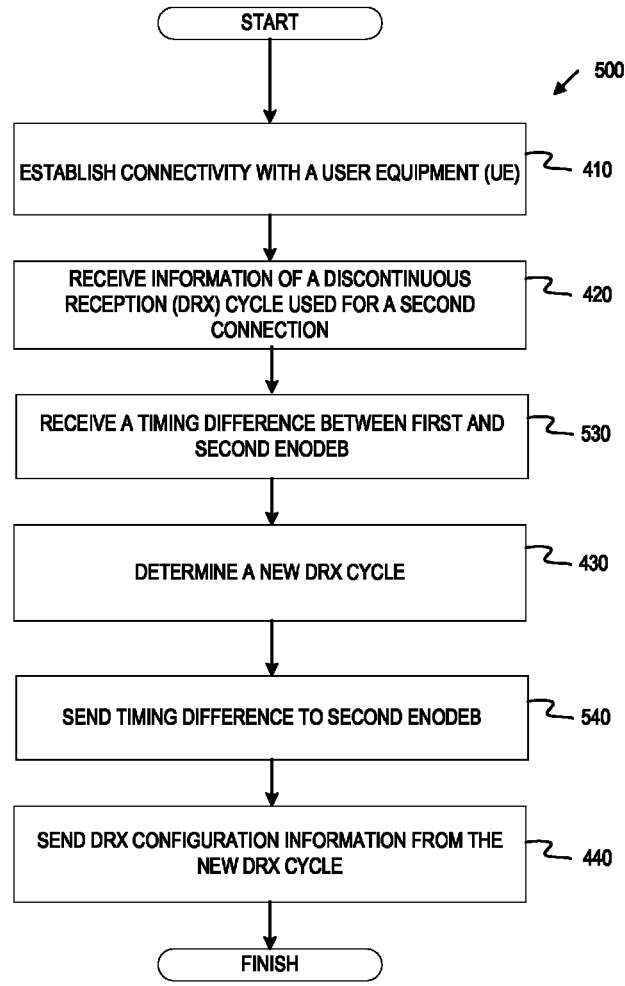
FIG. 5 is a flowchart illustrating an embodiment of a method of determining a new DRX cycle when there is a timing difference between eNBs.

FIG. 5 is a flowchart illustrating an embodiment of a method of determining a new DRX cycle when there is a timing difference between eNBs. The timing difference may be measured between system frame numbers (SFNs) of the two communication channels. For example, LTE uses SFN between 0 and 1023 that are 10 millisecond (ms) intervals and subframe numbers between 0 and 9 of 1 ms intervals for synchronizing communication on the communication channel between the transmitter and receiver. The timing difference between eNodeBs can be determined by the UE and reported to the eNodeB making the determination on the DRX configuration. Alternatively, the eNodeB may already be aware of the timing difference from the core network as described herein. The method 500 is performed by processing logic that comprises hardware (e.g., circuitry, dedicated logic, programmable logic, microcode, etc.), software (e.g., instructions run on a processing device to perform hardware simulation), or a combination thereof. In one embodiment, multi-connectivity DRX calculator 140 may perform method 500. In another embodiment, other components of the devices illustrated in FIGS. 1 and 2 perform some or all of the operations. Method 500 may be performed in any order so as to fit the needs of the DRX configuration to be accomplished.

Blocks 410 and 420 in method 500 may be the same operations as previously disclosed in method 400. At block 530, after receiving information of a DRX cycle in block 420, eNB1 110 receives a timing difference between eNB1 110 and eNB2 210. In one embodiment, the timing difference is the difference between the start times of each DRX cycle and the difference between the end times of each DRX cycle. In another embodiment, the timing difference is represented as the timing difference between a SFN used by the first eNodeB and a SFN used by the second eNodeB. In one embodiment, the timing difference may sent by UE 120. In another embodiment the timing difference in sent by eNB2 210. At block 430, multi-connectivity DRX calculator can determine a new DRX cycle based on the received timing difference. In one embodiment, a multi-connectivity DRX calculator in eNB1 110 determines the new DRX cycle. In another embodiment, a multi-connectivity DRX calculator in eNB2 210 makes the determination.

In one embodiment, the timing difference is sent by eNB1 110 over communication channel 204 (block 540). In one embodiment, the timing difference is sent by eNB2 210 over communication channel 204. In another embodiment, the timing difference is sent by UE 120. In yet another embodiment, the timing difference is already known by each of eNB1 110 and eNB2 210. It can be appreciated that block 540 is optional. It is sometimes the case that eNB2 210 does not need to know the timing difference between eNB2 210 and eNB1 110 and therefore need not receive it from eNB1 110 or UE 120. As in all other embodiments described, UE 120 may be concurrently connected to more than two eNBs (eNB1 110 and eNB2 210), therefore more than eNB1 110 and eNB2 210 may be aware of timing differences between eNBs.

After sending and receiving the timing difference, eNB1 110 or eNB2 210 can determine a new DRX cycle in block 430, based at least in part on the timing difference, and send the DRX cycle information to UE 120 in block 440. In one embodiment, there may be no timing difference between the DRX cycles used by eNB1 110 and eNB2 210, in which case the cycles are already time aligned (e.g., SFNs of eNB1 110 and eNB2 210 are time aligned). The new DRX cycle (a third DRX cycle) may be defined by the eNB1 110 with a start time that is time aligned with a start time of the first DRX cycle (or the second DRX cycle). In some cases, the new DRX cycle can be selected from one of the two existing time-aligned DRX cycles. Alternatively, the new DRX cycle can be determined in other manners as described herein.

Figure 6:
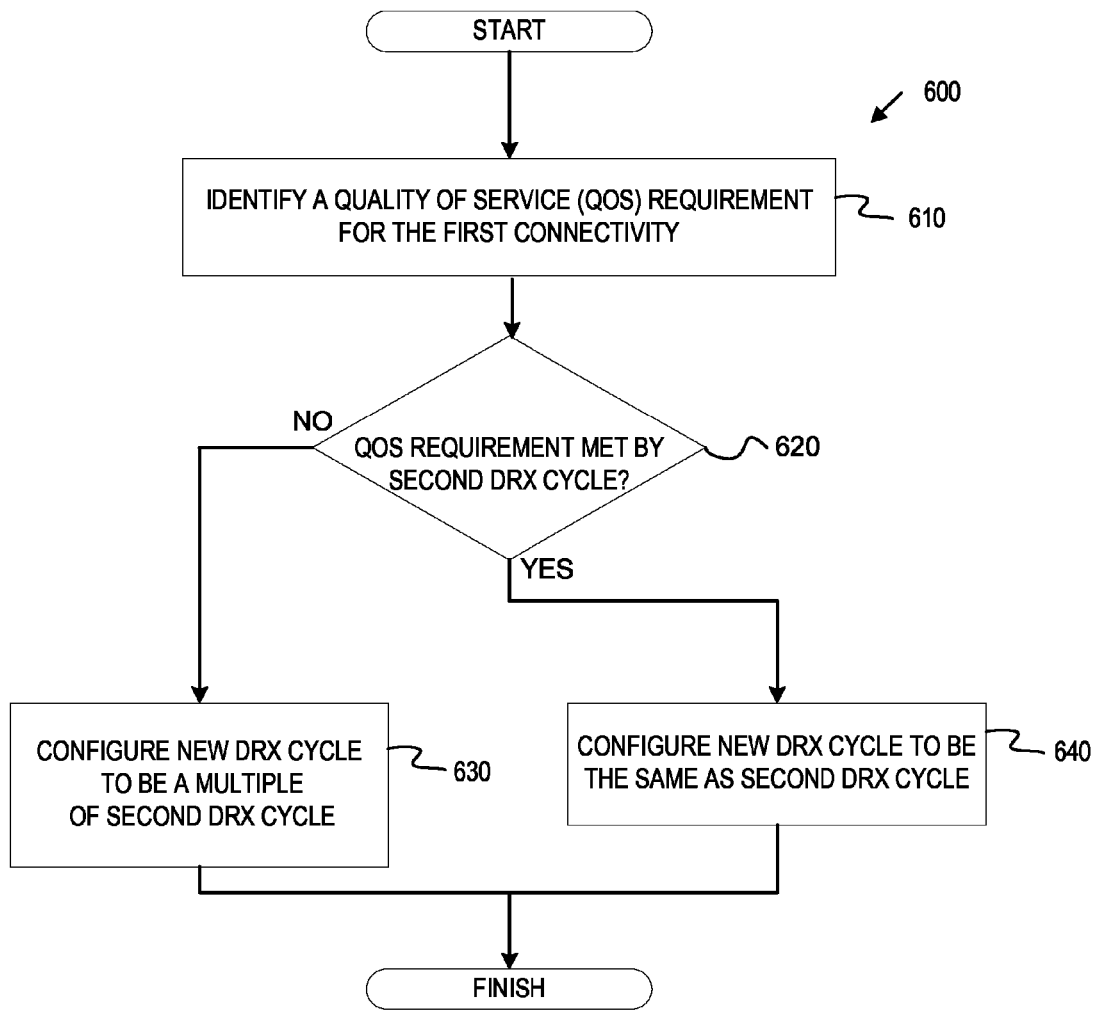
FIG. 6 is a flowchart illustrating an embodiment of a method of determining a new DRX cycle to meet a quality of service (QoS) requirement.

FIG. 6 is a flowchart illustrating an embodiment of a method of determining a new DRX cycle to meet a quality of service (QoS) requirement. The method 600 is performed by processing logic that comprises hardware (e.g., circuitry, dedicated logic, programmable logic, microcode, etc.), software (e.g., instructions run on a processing device to perform hardware simulation), or a combination thereof. In one embodiment, multi-connectivity DRX calculator 140 may perform method 600. In another embodiment, other components of the devices illustrated in FIGS. 1 and 2 perform some or all of the operations. Method 600 may be performed in any order so as to fit the needs of the DRX configuration to be accomplished.

At block 610, a quality of service (QoS) requirement is identified for a first communication channel with eNB1 110. In one embodiment, the QoS requirement may differentiate between protocols for categories of data transmission such as VPN, premium content, P2P file sharing, video streaming, IMS voice, non-IMS voice, and mobile-TV. In another embodiment, the QoS requirement may use other factors to determine appropriate DRX parameters for the multiple connections in the DRX configuration. The QoS requirement may be a set of one or more QoS parameters, such as bit rate, packet delay, packet loss, bit error rate, scheduling policy, or the like. For example, LTE defines various QoS parameters, such as QoS class indicator (QCI), Allocation and retention priority (ARP), maximum bit rate (MBR), Guaranteed bit rate (GBR), and aggregate maximum bit rate (AMBR). In other embodiments, other QoS parameters may be used in the set for the QoS requirement described herein.

In one embodiment, a first service with a first QoS may be assigned to eNB1 110 and a second service with a second QoS may be assigned to eNB2 210. Different QoS requirements may exist when multiple services are being handled independently across multiple eNBs. The DRX configuration for the multiple eNBs may utilize the same or different DRX parameters for the individual connections, depending on the QoS requirements of each service. For example, one connection may use a different "On Duration" parameter than another connection. However, when the "On Duration" parameters are different, the smallest parameter should be used to ensure operability with the two connections.

At block 620, eNB1 110 determines if the QoS identified at block 610 can be met by the UE on the first communication channel using the DRX cycle of eNB2 210. For example, the eNB1 110 can determine if the UE can meet a maximum bit rate on the first communication channel while powering off the radio resources per the DRX cycle of eNB2 210. If eNB1 110 determines the QoS can be met at block 620, flow continues to block 640 where a new DRX cycle is configured to be the same as the DRX cycle used by the UE 120 for the communication channel with eNB2 210. Alternatively, if the QoS cannot be met by the DRX cycle used by the UE for the communication channel with eNB2 210, flow continues to block 630 where a new DRX cycle is configured to be a multiple of the DRX cycle used by the UE 120 for the communication channel with eNB2 210. In another embodiment, the DRX parameters for the DRX configuration are determined for eNB1 110 and for eNB2 210 based on QoS requirements for eNB1 110 and for eNB2 210, and the smaller of the two DRX parameters is selected. In another embodiment, the new DRX in operation 430 may be determined in other ways. As an example, DRX operation 430 may be implemented in multi-connectivity DRX calculator 140 by performing the operations as expressed in following pseudo-code:

if a HARQ RTT Timer expires on the HARQ process of any cell in this subframe and the data of the corresponding HARQ process was not successfully decoded:
    start the drx-RetransmissionTimer for the corresponding HARQ process.
if a DRX Command MAC control element is received on any cell
    if there are pending DRX Command MAC Control element from all other cells that the UE is listening to
        stop onDurationTimer;
        stop drx-InactivityTimer.
    else
        keep the DRX Command MAC control element as pending.
if drx-InactivityTimer expires or a DRX Command MAC control element has already been received from all the cells that the UE is listening to except this one:
    if the Short DRX cycle is configured for any cell(s) use the smallest configured Short DRX cycle and:
        start or restart drxShortCycleTimer; the definition of this timer is as per 3GGP release 10 spec number 36.321
    use the Short DRX Cycle.
else:
    if the Long DRX cycle is configured for any cell(s) use the smallest configured Long DRX cycle.
if drxShortCycleTimer expires in this subframe:
    use the Long DRX cycle.

If the Short DRX Cycle is used and [(SFN*10)+subframe number] modulo (shortDRX-Cycle)=(drx-StartOffset) modulo (shortDRX-Cycle); or     Formula (1)

if the Long DRX Cycle is used and [(SFN*10)+subframe number] modulo (longDRX-Cycle)=drx-StartOffset:     Formula (2)

start onDurationTimer.
Note—In Formula (1) and Formula (2) the value of shortDRX-Cycle and longDRX-Cycle should be the smallest among these values configured by all the eNBs, onDurationTimer value should be the longest among all the values configured by the various eNBs. The formula should be calculated with the drxStartOffset configured by each eNB and the onDurationTimer should be restarted for each SFN and subframe number where the formula is satisfied.

during the Active Time, for a PDCCH-subframe, if the subframe is not required for uplink transmission for half-duplex FDD UE operation and if the subframe is not part of a configured measurement gap on any cell:
monitor the PDCCH on each cell or at least the PCell of each eNB (if configured for Cross Carrier Scheduling);
if the PDCCH on a cell indicates a DL transmission or if a DL assignment has been configured for this subframe:
start the HARQ RTT Timer for the corresponding HARQ process;
stop the drx-RetransmissionTimer for the corresponding HARQ process.
if the PDCCH indicates a new transmission (DL or UL):
start or restart drx-InactivityTimer.
when not in Active Time, type-0-triggered SRS [2] shall not be reported.
if CQI masking (cqi-Mask) is setup by upper layers:
when onDurationTimer is not running, CQI/PMI/RI/PTI on PUCCH shall not be reported.
else:
when not in Active Time, CQI/PMI/RI/PTI on PUCCH shall not be reported.

Regardless of whether the UE is monitoring PDCCH or not, the UE receives and transmits HARQ feedback and transmits type-1-triggered SRS when such is expected.

Figure 7:
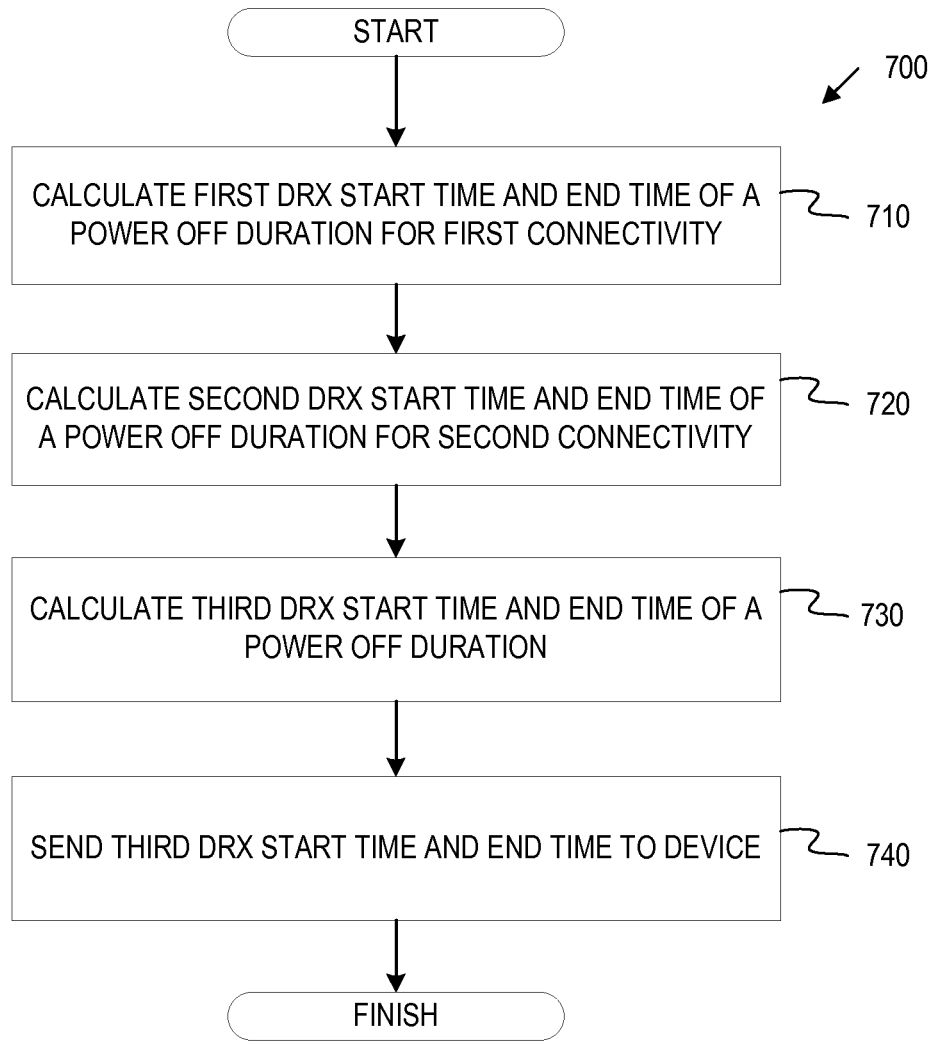
FIG. 7 is a flowchart illustrating an embodiment of a method of calculating a new DRX cycle based on a first existing DRX cycle and a second existing DRX cycle.

FIG. 7 is a flowchart illustrating an embodiment of a method of calculating a new DRX cycle based on a first existing DRX cycle and a second existing DRX cycle. The method 700 is performed by processing logic that comprises hardware (e.g., circuitry, dedicated logic, programmable logic, microcode, etc.), software (e.g., instructions run on a processing device to perform hardware simulation), or a combination thereof. In one embodiment, multi-connectivity DRX calculator 140 may perform method 700. In another embodiment, other components of the devices illustrated in FIGS. 1 and 2 perform some or all of the operations. Method 700 may be performed in any order so as to fit the needs of the DRX configuration to be accomplished.

At block 710, eNB1 110 calculates a DRX start time and a DRX end time for a first communication channel 145. The DRX start time indicates the time that UE can power down radio resources and the DRX end time indicates the time that the UE can power up radio resources, such as to monitor for PDCCH. In one embodiment, the DRX start time is the time at which the DRX onDurationTimer starts for a given DRX cycle and the DRX end time is the time at which the DRX onDurationTimer ends for the given DRX cycle. In another embodiment, a different timer is used, such as a DRX-inactivity timer. At block 720, the same calculation is done for the start time and end time of a second DRX cycle used by the UE 120 for communication channel 235.

When both calculations have been done, a third DRX cycle is determined at block 730. In one embodiment, the third DRX cycle is determined by choosing the later of the two start times calculated in blocks 710 and 720 as the start time for the cycle. The end time may be determined in a similar way of choosing the earlier of the two end times calculated in blocks 710 and 720 to be the end time of the third DRX cycle. In this way, the third DRX cycle will be a subset of the first and the second DRX cycles. At block 740, the start and end times of the third DRX cycle are sent to UE 120.

Figure 8:
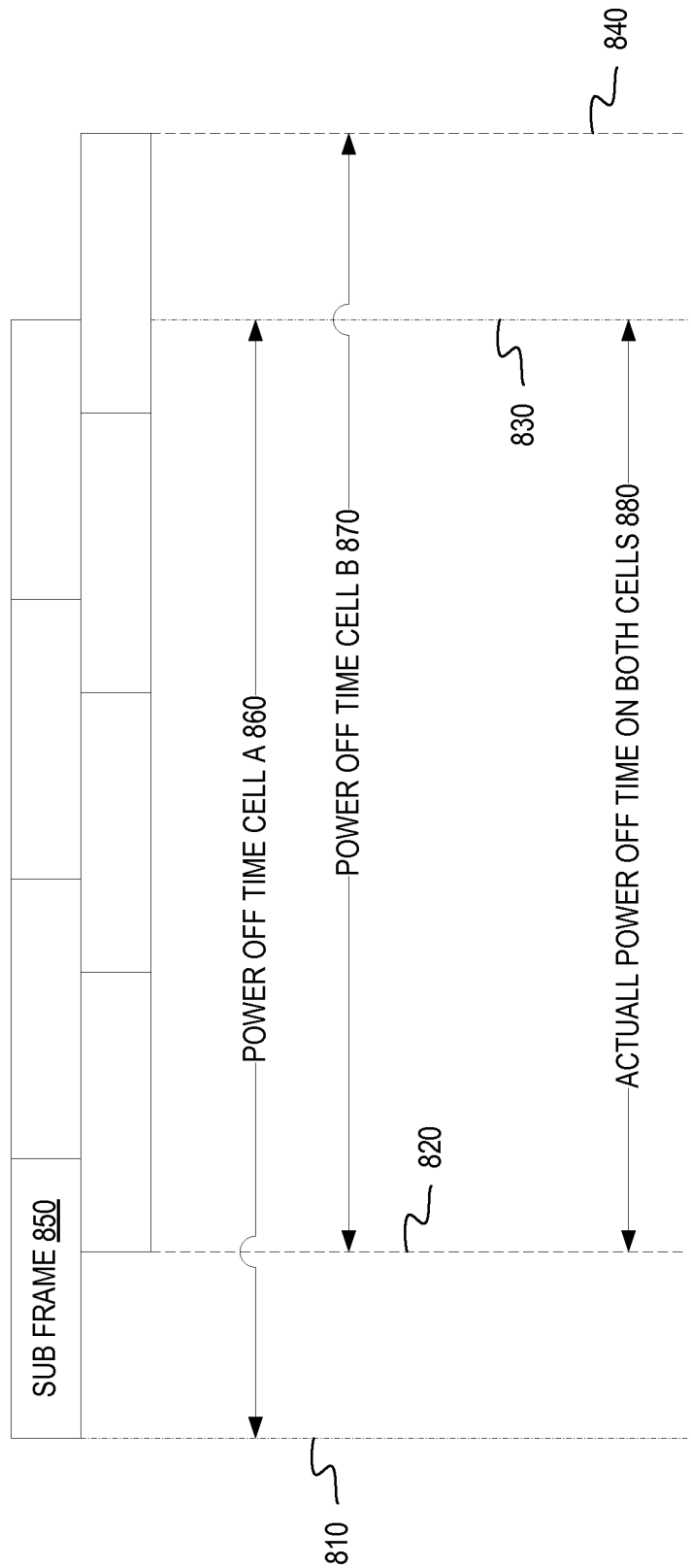
FIG. 8 is a block diagram illustrating two non-time-aligned DRX enabled periods, in accordance with one embodiment.

FIG. 8 is a block diagram illustrating two non-time-aligned DRX enabled periods, in accordance with one embodiment. The example in FIG. 8 shows two DRX enabled periods that run for four sub frames each 850. The two DRX enabled periods correspond to two nodes (eNB1 110 and eNB2 210). The first DRX enabled period starts at 810 and ends at 830 and therefore cell A (communication channel with eNB1 110) is powered off 860 from 810 to 830. The second DRX enabled period starts at 820 and ends at 840, meaning that cell B (communication channel with eNB2 210) is powered off 870 from 820 to 840. In one embodiment, according to method 700, a third DRX enabled period may be calculated using the start times and end times for the first and the second DRX enabled period illustrated in FIG. 8. The third DRX enabled period may be calculated by using the later of DRX start times 810 and 820 as the new start time and the earlier of DRX end times 830 and 840 as the new end time. In this example, the third DRX would have a start time of 820 and an end time of 830. Therefore, the actual power-off time 880 for both nodes eNB1 110 and eNB2 210 is the time starting at 820 and ending at 830.

Figure 9:
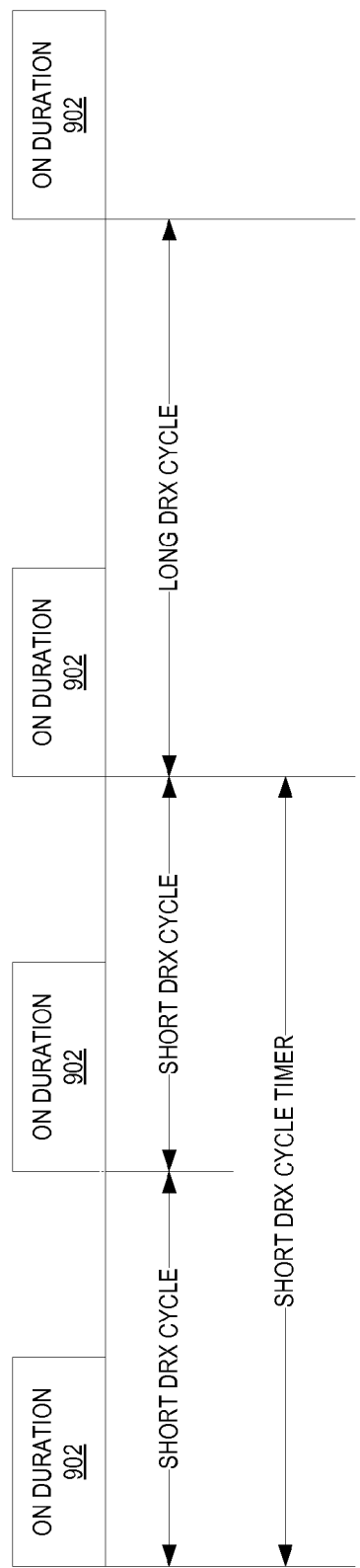
FIG. 9 is a block diagram illustrating the stages of an exemplary DRX cycle, in accordance with one embodiment.

In one embodiment, DRX cycles can include a DRX enabled period during with time the DRX is active. A DRX cycle may also include time in which the DRX is inactive. A DRX cycle may also be a short cycle or a long cycle. A DRX short cycle is a cycle that lasts for a duration that is shorter than a DRX long cycle. A DRX short cycle may use more power, but produce less lag in decoding PDCCH transmissions. Alternatively, a DRX long cycle may use less power, but produce more lag in decoding PDCCH transmissions. FIG. 9 and its description provide more details about the DRX cycle.

FIG. 9 is a block diagram illustrating the stages of an exemplary DRX cycle, in accordance with one embodiment. The UE 120 is awake, meaning that the DRX is inactive, in the on duration blocks 902. In one embodiment, once the on duration 902 begins, meaning the DRX is inactive, the onDurationTimer counts down from some predetermined value. In one embodiment, the onDurationTimer represents an amount of time that the DRX should remain inactive so that UE 120 is receptive to transmissions. When the timer expires, the DRX is again enabled. In one embodiment, one complete DRX short cycle lasts from the beginning of one on duration 902 to the beginning of the next on duration 902.

In one embodiment, a DRX-inactivity timer is the number of sub frames that the UE 120 waits to successfully decode a PDCCH from the last time UE 120 successfully decoded a PDCCH. In one embodiment, system frames and sub frames may be used to determine timing of actions in UEs and eNBs. A system frame may be 10 ms in duration and a sub frame may be 1 ms in duration. Before a UE and an eNB begin communications, they may set their respective system frames and sub frames to be the same number. This synchronization allows for precise DRX cycle timing. When UE 120 decodes a PDCCH, the DRX-inactivity timer restarts. So long as the DRX-inactivity timer has not reached a predetermined threshold, the DRX remains inactive. In this way, UE 120 can be prevented from entering into a sleeping state while there is a high frequency between PDCCH decodes. The minimum amount of time a UE 120 can remain in an on duration 902 is the length of the onDurationTimer. The maximum amount of time a UE 120 can remain in an on duration 902 is infinite, since the DRX-inactivity timer can prevent enabling of the DRX if the frequency between PDCCH decodes is high enough. In one embodiment, once the DRX-inactivity timer expires, the DRX enabled period activates in UE 120.

In one embodiment, a DRX short cycle timer may be used to represent the consecutive number of sub frames in which the DRX engine 130 should activate the short DRX cycle before starting a long DRX cycle. During a long DRX cycle, the UE 120 is in an inactive state for longer than the duration of a short cycle, thus requiring less power. In FIG. 9 the DRX short cycle timer expires after two DRX short cycles, at which time a DRX long cycle begins. In one embodiment, when a PDCCH is successfully decoded, the DRX short cycle timer restarts and therefore the next active DRX cycle is a short DRX cycle.

Figure 10:
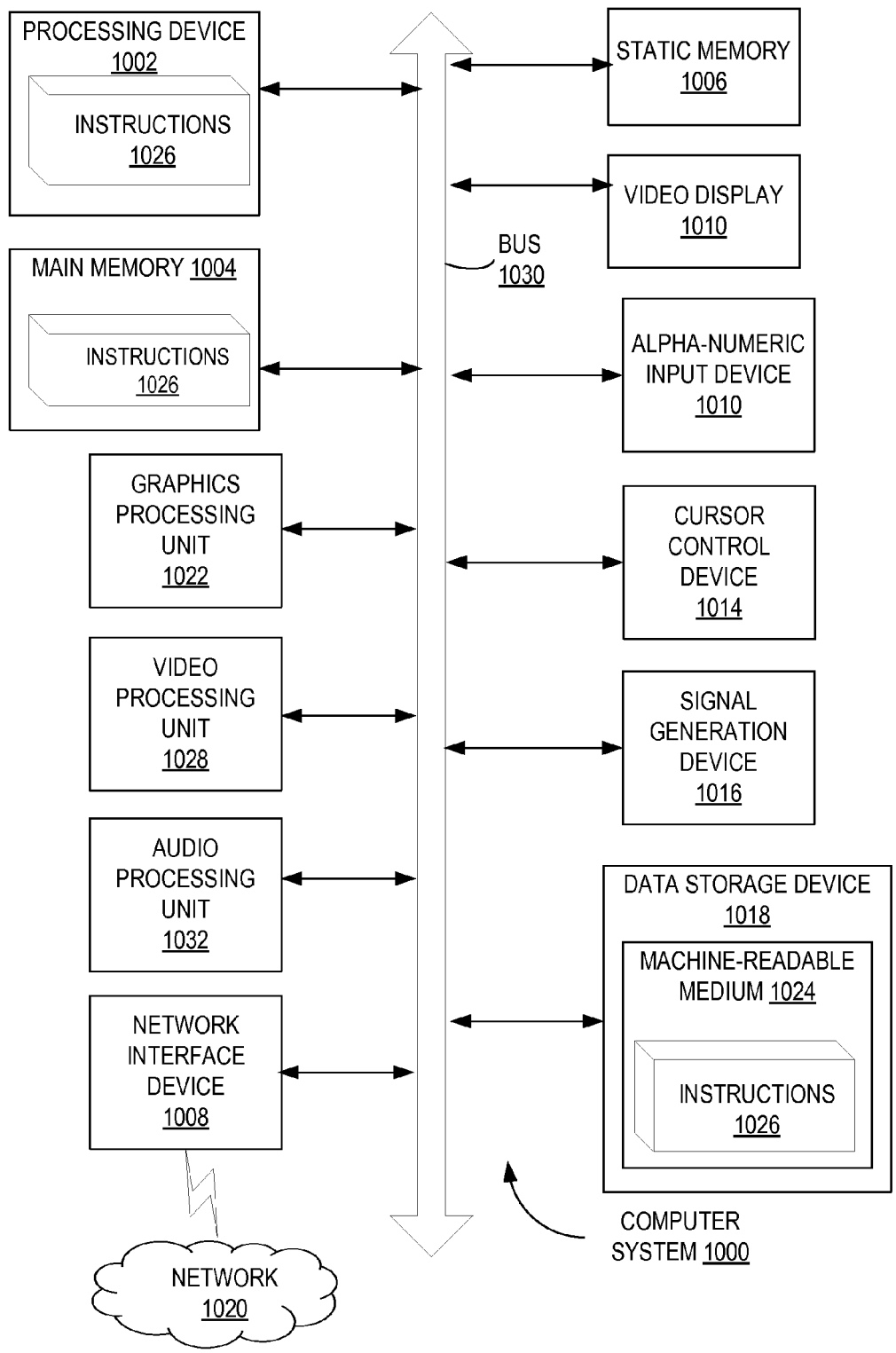
FIG. 10 illustrates a functional block diagram of an exemplary electronic device, in accordance with one embodiment.

FIG. 10 illustrates a diagrammatic representation of a machine in the exemplary form of a computer system 1000 within which a set of instructions, for causing the machine to perform any one or more of the methodologies discussed herein, may be executed. The computer system 1000 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet or the Internet. The machine may operate in the capacity of a server machine in client-server network environment. The machine may be a personal computer (PC), a set-top box (STB), a server, a network router, switch or bridge or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, the computer system 1000 may represent the first eNodeB 110, second eNodeB 210, first user equipment 120, second user equipment 220, or any of the core network components 301-303 of FIG. 1.

The computer system 1000 includes a processing device (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)) and a data storage device 1018, which communicate with each other via a bus 1030.

The processing device 1002 represents one or more general-purpose processing devices such as a microprocessor, central processing unit or the like. More particularly, the processing device 1002 may be a complex instruction set computing (CISC) microprocessor, reduced instruction set computing (RISC) microprocessor, very long instruction word (VLIW) microprocessor or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor or the like. The processing device 1002 is configured to execute the processing logic 1026 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and a signal generation device 1016 (e.g., a speaker).

The data storage device 1018 may include a computer-readable medium 1024 on which is stored one or more sets of instructions 1022 (e.g., instructions to perform the method 500 of FIG. 5 or the method 600 of FIG. 6) embodying any one or more of the methodologies or functions described herein. Instructions 1022 may implement the multi-connectivity DRX calculator 140. The instructions 1022 may also reside, completely or at least partially, within the main memory 1004 and/or within processing logic 1026 of the processing device 1002 during execution thereof by the computer system 1000, the main memory 1004 and the processing device 1002 also constituting computer-readable media. The instructions 1022 may further be transmitted or received over a network 1020 via the network interface device 1008.

While the computer-readable storage medium 1024 is shown in an exemplary embodiment to be a single medium, the term "non-transitory computer-readable storage medium" or "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

Figure 11:
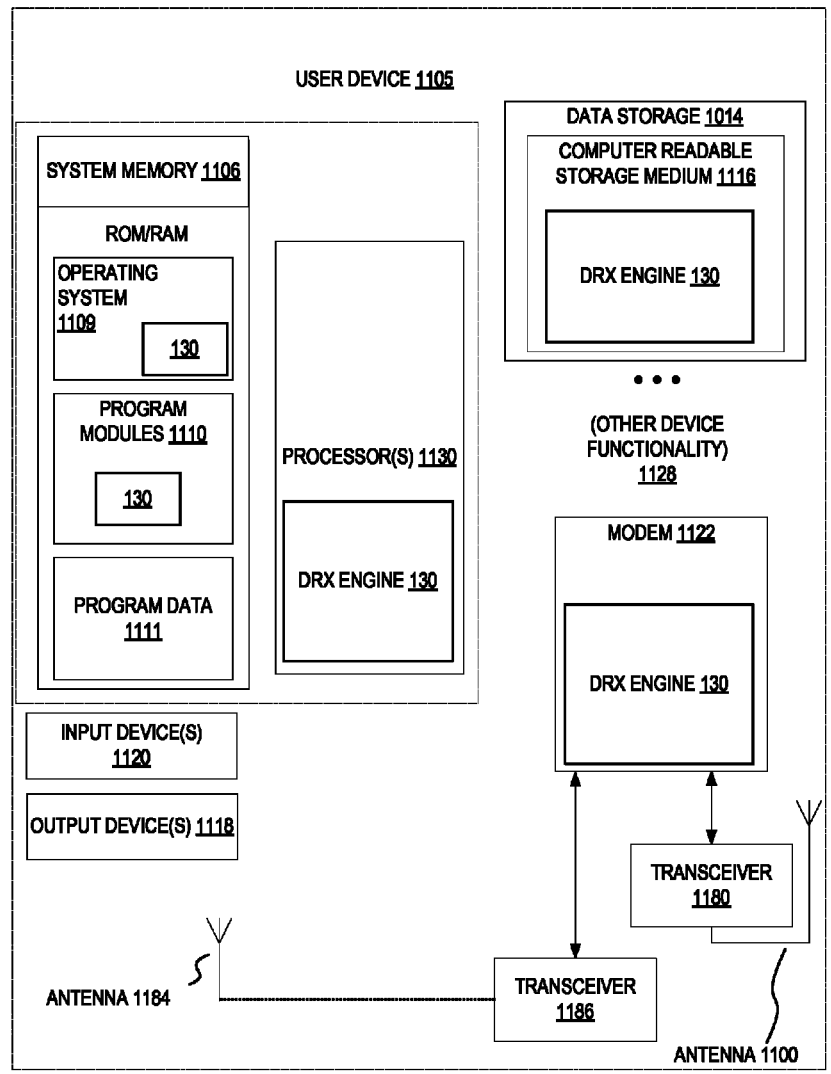
FIG. 11 illustrates a functional block diagram of a user device having one of the antenna structures described herein, in accordance with one embodiment.

FIG. 11 is a block diagram of a user device having an antenna 1100 according to one embodiment. The user device 1105 includes one or more processors 1130, such as one or more CPUs, microcontrollers, field programmable gate arrays, or other types of processing devices. The user device 1105 also includes system memory 1106, which may correspond to any combination of volatile and/or non-volatile storage mechanisms. The system memory 1106 stores information, which provides an operating system component 1108, various program modules 1110, program data 1112, and/or other components. Operating system component may include DRX engine 130. Program modules 1110 may also include DRX engine 130. The user device 1105 performs functions by using the processor(s) 1130 to execute instructions provided by the system memory 1106. Processor 1130 may include DRX engine 130. DRX engine 130 may be processing logic that comprises hardware (e.g., circuitry, dedicated logic, programmable logic, microcode, etc.), software (e.g., instructions run on a processing device to perform hardware simulation), or a combination thereof. In one embodiment DRX engine 130 can receive DRX configuration information at user device 1105 from the multi-connectivity calculator 140.

The user device 1105 also includes a data storage device 1114 that may be composed of one or more types of removable storage and/or one or more types of non-removable storage. The data storage device 1114 includes a computer-readable storage medium 1116 on which is stored one or more sets of instructions embodying any one or more of the functions of the user device 1105, as described herein. As shown, instructions, including DRX engine 130, may reside, completely or at least partially, within the computer readable storage medium 1116, system memory 1106 and/or within the processor(s) 1130 during execution thereof by the user device 1105, the system memory 1106 and the processor(s) 1130 constituting computer-readable media. DRX engine 130 may also be stored computer-readable storage medium 1116. The user device 1105 may also include one or more input devices 1120 (keyboard, mouse device, specialized selection keys, etc.) and one or more output devices 1118 (displays, printers, audio output mechanisms, etc.).

The user device 1105 further includes a wireless modem 1122 to allow the user device 1105 to communicate via a wireless network (e.g., such as provided by a wireless communication system) with other computing devices, such as remote computers, an item providing system, and so forth. The wireless modem 1122 allows the user device 1105 to handle both voice and non-voice communications (such as communications for text messages, multimedia messages, media downloads, web browsing, etc.) with a wireless communication system. The wireless modem 1122 may provide network connectivity using any type of digital mobile network technology including, for example, cellular digital packet data (CDPD), general packet radio service (GPRS), enhanced data rates for GSM evolution (EDGE), UMTS, 1 times radio transmission technology (1xRTT), evaluation data optimized (EVDO), high-speed downlink packet access (HSDPA), wireless local area network (WLAN) (e.g., Wi-Fi® network), etc. In other embodiments, the wireless modem 1122 may communicate according to different communication types (e.g., WCDMA, GSM, LTE, CDMA, WiMax, etc.) in different cellular networks. The cellular network architecture may include multiple cells, where each cell includes a base station configured to communicate with user devices within the cell. These cells may communicate with the user devices 1105 using the same frequency, different frequencies, same communication type (e.g., WCDMA, GSM, LTE, CDMA, WiMax, etc.), or different communication types. Each of the base stations may be connected to a private, a public network, or both, such as the Internet, a local area network (LAN), a public switched telephone network (PSTN), or the like, to allow the user devices 1105 to communicate with other devices, such as other user devices, server computing systems, telephone devices, or the like. In addition to wirelessly connecting to a wireless communication system, the user device 1105 may also wirelessly connect with other user devices. For example, user device 1105 may form a wireless ad hoc (peer-to-peer) network with another user device.

The wireless modem 1122 may generate signals and send these signals to transceiver 1180 or transceiver 1186 for amplification, after which they are wirelessly transmitted via the antenna 1100 or antenna 1184, respectively. In one embodiment, a single transceiver (TRX) may be used in concurrent connectivity with multiple eNBs. In another embodiment, multiple TRXs may be used in concurrent connectivity with multiple eNBs. The antenna 1184, which is an optional antenna that is separate from the antenna 1100, may be any directional, omnidirectional or non-directional antenna in a different frequency band than the frequency bands of the antenna 1100. The antenna 1184 may also transmit information using different wireless communication protocols than the antenna 1100. In addition to sending data, the antenna 1100 and the antenna 1184 also receive data, which is sent to wireless modem 1122 and transferred to processor(s) 1130. It should be noted that, in other embodiments, the user device 1105 may include more or less components as illustrated in the block diagram of FIG. 11.

In one embodiment, the user device 1105 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot (e.g., Wi-Fi® hotspot) and a connection to a wireless carrier system. In one embodiment, the first wireless connection is associated with a first resonant mode of the antenna 1100 that operates at a first frequency band and the second wireless connection is associated with a second resonant mode of the antenna 1100 that operates at a second frequency band. In another embodiment, the first wireless connection is associated with the antenna 1100 and the second wireless connection is associated with the antenna 1184. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a single modem 1122 is shown to control transmission to both antennas 1100 and 1184, the user device 1105 may alternatively include multiple wireless modems, each of which is configured to transmit/receive data via a different antenna and/or wireless transmission protocol. In addition, the user device 1105, while illustrated with two antennas 1100 and 1184, may include more or fewer antennas in various embodiments.

The user device 1105 delivers and/or receives items, upgrades, and/or other information via the network. For example, the user device 1105 may download or receive items from an item providing system. The item providing system receives various requests, instructions and other data from the user device 1105 via the network. The item providing system may include one or more machines (e.g., one or more server computer systems, routers, gateways, etc.) that have processing and storage capabilities to provide the above functionality. Communication between the item providing system and the user device 1105 may be enabled via any communication infrastructure. One example of such an infrastructure includes a combination of a wide area network (WAN) and wireless infrastructure, which allows a user to use the user device 1105 to purchase items and consume items without being tethered to the item providing system via hardwired links. The wireless infrastructure may be provided by one or multiple wireless communications systems, such as one or more wireless communications systems. One of the wireless communication systems may be a WLAN hotspot (e.g., Wi-Fi® hotspot) connected with the network. Another of the wireless communication systems may be a wireless carrier system that can be implemented using various data processing equipment, communication towers, etc. Alternatively, or in addition, the wireless carrier system may rely on satellite technology to exchange information with the user device 1105.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 1105 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1105 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The preceding description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes or it may include a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions.

The algorithms and displays presented herein are not inherently related to any particular computer or other apparatus. Various general purpose systems may be used with programs in accordance with the teachings herein or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    establishing, by a first evolved node B (eNodeB), a first communication channel with a user equipment (UE), wherein the UE uses a first Discontinuous Reception (DRX) cycle to identify when to power off and power on radio resources of the UE to communicate with the first eNodeB on the first communication channel, and wherein the UE is concurrently connected to the first eNodeB and a second eNodeB;
    receiving, by the first eNodeB, information of a second DRX cycle used by the UE for a second communication channel between the second eNodeB and the UE, wherein the second DRX cycle identifies when to power off and power on the radio resources to communication with the second eNodeB on the second communication channel;
    determining, by the first eNodeB, a third DRX cycle using at least the information of the second DRX cycle, wherein the third DRX cycle identifies when the UE can power off and power on the radio resources while the UE is concurrently connected to the first eNodeB on the first communication channel and the second eNodeB on the second communication channel;
    sending DRX configuration information of the third DRX cycle to the UE, wherein the DRX configuration information is used by the UE for the first communication channel and the second communication channel, wherein the DRX configuration information comprises a duration during which the UE monitors a physical downlink control channel and a DRX period during which a UE can power off the radio resources;
    determining, by the first eNodeB, whether a QoS requirement can be met by the UE on the first communication channel using the second DRX cycle;
    configuring the third DRX cycle to be the same as the second DRX cycle when the QoS requirement can be met; and
    configuring the third DRX cycle to be a multiple of the second DRX cycle when the QoS requirement cannot be met.

2. The method of claim 1, further comprising:
    receiving, by the first eNodeB from the UE, a timing difference between a system frame number (SFN) used by the second eNodeB and a SFN used by the first eNodeB; and
    sending, by the first eNodeB, the timing difference and the DRX configuration information to the second eNodeB.

3. The method of claim 1, wherein system frame numbers (SFNs) used by the first eNodeB and the second eNodeB are time aligned, and wherein the determining the third DRX cycle comprises defining a start time of the third DRX cycle to be time aligned to a start time of the first DRX cycle.

4. A method comprising:
    determining, by a first node of a wireless communication network, that a device is concurrently connected to the first node and a second node of the wireless communication network;
    determining, by the first node, a start time and duration of powering down radio resource of the device in a discontinuous reception (DRX) configuration for both a first communication channel between the device and the first node and a second communication channel between the device and the second node using at least an existing DRX cycle used by the device for the second communication channel between the device and the second node;
    sending, by the first node, the DRX configuration to the device, wherein the DRX configuration specifies a new DRX cycle, wherein the device is to use the new DRX cycle when concurrently connected to the first node and the second node of the wireless communication network;
    determining, by the first node, whether a QoS requirement can be met by the device on the first communication channel using the existing DRX cycle;
    configuring the new DRX cycle to be the same as the existing DRX cycle when the QoS requirement can be met; and
    configuring the new DRX cycle to be a multiple of the existing DRX cycle when the QoS requirement cannot be met.

5. The method of claim 4, wherein the determining the start time and the duration of the DRX configuration comprises determining a start time and a duration of a first DRX cycle used by the device for the first communication channel between the device and the first node.

6. The method of claim 4, further comprising receiving, by the first node, information of the existing DRX cycle used by the device for the second communication channel from at least one of the device or the second node, and wherein the determining the start time and the duration of the DRX configuration comprises at least one of:
    configuring a first DRX cycle to be used by the device for the first communication channel to be the same as the second DRX cycle to be used by the device for the second communication channel; or
    configuring the first DRX cycle to be a multiple of the second DRX cycle.

7. The method of claim 4, wherein a first service is handled by the first node and a second service is handled by the second node, and wherein the determining the start time and the duration of the DRX configuration comprises:
    determining, by the first node, a first QoS requirement for the first service;
    determining, by the first node, a second QoS requirement for the second service; and
    determining the start time and the duration of the DRX configuration in view of the first QoS requirement and the second QoS requirement.

8. The method of claim 7, wherein the first QoS requirement is different from the second QoS requirement, and wherein the determining the start time and the duration of the DRX configuration further comprises:
    determining, by the first node, a first DRX parameter for the first service in view of the first QoS requirement;
    determining, by the first node, a second DRX parameter for the second service in view of the second QoS requirement; and
    selecting a smallest one of the first DRX parameter or the second DRX parameter for the DRX configuration.

9. The method of claim 4, further comprising:
    receiving, by the first node, a timing difference between a system frame number (SFN) used by the first node and a system frame number (SFN) used by the second node; and
    sending, by the first node, the timing difference and the DRX configuration to the second node.

10. The method of claim 9, wherein the determining the start time and the duration of the DRX configuration comprises:
    calculating a first DRX start time and a first DRX end time, wherein the first DRX start time indicates a beginning of a power off duration during which the device powers down the radio resources for the first communication channel and the first DRX end time indicates an end of the power off duration;
    calculating a second DRX start time and a second DRX end time, wherein the second DRX start time indicates a beginning of a power off duration during which the device powers down the radio resources for the second communication channel;
    determining a third DRX start time and a third DRX end time, wherein the third DRX start time indicates a beginning of a power off duration during which the device powers down the radio resources for the first and second communication channels, wherein the third DRX start time is the later of the first DRX start time and the second DRX start time, and wherein the third DRX end time is the earlier of the first DRX end time and the second DRX end time; and
    sending, to the device, the third DRX start time and the third DRX end time.

11. The method of claim 4, wherein the first node and the second node are time aligned, and wherein the determining the start time and the duration of the DRX configuration comprises configuring a first DRX cycle used by the device for the first communication channel to be time aligned with a second DRX cycle to be used by the device for the second communication channel.

12. The method of claim 4, wherein the determining the start time and the duration of the DRX configuration comprises determining the start time and the duration of the DRX configuration to be used by a single transceiver (TRX) at the device.

13. The method of claim 4, wherein the determining the start time and the duration of the DRX configuration comprises determining the start time and the duration of the DRX configuration to be used by a plurality of transceivers (TRX) at the device.

14. A non-transitory computer-readable storage medium storing instructions which, when executed, cause a computer system to perform operations comprising:

determining, by a first node of a wireless communication network, that a device is concurrently connected to the first node and a second node of the wireless communication network;

determining, by the first node, a start time and duration of powering down radio resource of the device in a discontinuous reception (DRX) configuration for both a first communication channel between the device and the first node and a second communication channel between the device and the second node using at least an existing DRX cycle used by the device for the second communication channel between the device and the second node;

sending, by the first node, the DRX cycle to the device, wherein the device is to use the DRX cycle when concurrently connected to the first node and the second node of the wireless communication network;

determining, by the first node, whether a QoS requirement can be met by the device on the first communication channel using the existing DRX cycle;

configuring the DRX cycle to be the same as the existing DRX cycle when the QoS requirement can be met; and configuring the DRX cycle to be a multiple of the existing DRX cycle when the QoS requirement cannot be met.

15. The non-transitory computer-readable storage medium of claim 14, wherein the determining the start time and the duration of the DRX configuration comprises determining a new DRX cycle to be used by the device both the first communication channel between the device and the first node and for the second communication channel between the device and the second node.

16. The non-transitory computer-readable storage medium of claim 14, further comprising:

receiving, by the first node, a timing difference between a system frame number (SFN) used by the first node and a system frame number (SFN) used by the second node; and sending, by the first node, the timing difference and the DRX configuration to the second node.

17. The non-transitory computer-readable storage medium of claim 14, wherein the operations further comprise receiving, by the first node, information of the existing DRX cycle used by the device for the second communication channel from at least one of the device or the second node, and wherein the determining the start time and the duration of the DRX configuration comprises at least one of:

configuring a first DRX cycle to be used by the device for the first communication channel to be the same as the second DRX cycle used by the device for the second communication channel; or configuring the first DRX cycle to be a multiple of the second DRX cycle.

18. The non-transitory computer-readable storage medium of claim 14, wherein a first service is handled by the first node and a second service is handled by the second node, and wherein the determining the start time and the duration of the DRX configuration comprises:

determining, by the first node, a first quality of service (QoS) requirement for the first service;

determining, by the first node, a second QoS requirement for the second service; and determining the start time and the duration of the DRX configuration in view of the first QoS requirement and the second QoS requirement.

* * * * *